United States Patent [19]

Heisey

[11] Patent Number: 4,970,988
[45] Date of Patent: Nov. 20, 1990

[54] METHOD AND APPARATUS FOR MONITORING ANIMAL MIGRATION

[75] Inventor: Paul G. Heisey, Washington Boro, Pa.

[73] Assignee: RMC Environmental Services, Inc., Pottstown, Pa.

[21] Appl. No.: 473,780

[22] Filed: Feb. 1, 1990

[51] Int. Cl.⁵ .......................... A01K 61/00; G09F 3/00
[52] U.S. Cl. .......................................... 119/3; 40/300
[58] Field of Search .............. 119/3; 40/300; 606/116, 606/117

[56] References Cited

U.S. PATENT DOCUMENTS

| | | | |
|---|---|---|---|
| 2,121,787 | 6/1938 | Dahlgren | 175/265 |
| 3,545,405 | 12/1970 | Jeffers | 119/3 |
| 4,392,236 | 7/1983 | Sandstrom et al. | 378/45 |
| 4,646,455 | 3/1987 | Gardner | 40/301 |
| 4,672,967 | 6/1987 | Smith | 128/330 |
| 4,750,490 | 6/1988 | Haw et al. | 128/330 |
| 4,790,090 | 12/1988 | Sharber | 40/300 |
| 4,920,670 | 5/1990 | Amick | 119/3 X |

FOREIGN PATENT DOCUMENTS 1109103  8/1984  U.S.S.R. .................. 119/3

OTHER PUBLICATIONS

Eicher, *Turbine Related Fish Mortality: Review and Evaluation Studies*, Nov. 1987, pp. 4–1 thru 4–7.
Nettles and Gloss, *Migration of Landlocked Atlantic Salmon*, North Am. J. of fish. Mgmt., 7:562–568, 1987.
Stier and Kynard, *Use of radiotelemetry to Determine the Mortality of Atlantic Salmon*, Trans. of Am. Fish.Soc., 115:771–775, 1986.
Stokesbury, *Downstream Movements of Juvenile Alosids and Juvenile Fish Mortality Associated with the Annapolis Tidal Power Turbine*, Field Report, 1986, Contribution No. 5, Acadia centre for Estuarine Research, Wolfville, Nova Scotia.
*Millville Hydro Station FERC Project No. 2343 Fish Entrainment Studies*, Prepared for the Potomac Edison Co., and the Allegheny Power Services Corp., Jan., 1987, pp. 8–12.
*Underwater Telemetry–Tracking Aquatic Animals Newsletter*, vol. 11(1), Jan., 1981, pp. 1–3.
Knight, *Radio Telemetry as a Tool for Estimating Migrating Fish Survival and Behavior*, Technical Paper, Northeast Society of Conservation engineers, 1979 Northeast Fish and Wildlife Conf., Providence, Rhode Island, Apr. 3, 1979, pp. 1–4.

Primary Examiner—Robert P. Swiatek
Attorney, Agent, or Firm—Lawrence A. Husick; Daniel H. Golub

[57] ABSTRACT

Method and apparatus for monitoring migration of tagged fish which also facilitates their retrieval, including a selectively activated floatation device and securing member and a method for employing them.

28 Claims, 2 Drawing Sheets

METHOD AND APPARATUS FOR MONITORING ANIMAL MIGRATION

BACKGROUND

This invention relates to a method and apparatus for monitoring the movement of macro-organisms. More particularly the instant invention relates to a method and apparatus for tagging and retrieving fish.

For many years, biologists and fisheries managers have monitored the migratory habits of fish. In recent years, particular emphasis has been placed upon studying the migratory habits of anadromous and catadromous fish as these fish migrate past dams and hydroelectric facilities. This emphasis has focused, in part, on studying the effects which passage through a turbine or fishway may have on a fish population, as migratory and resident fish may suffer injury when passing through a hydroelectric facility. However, as discussed at length in *Turbine Related Fish Mortality; Review and Evaluation of Studies* AP-5480 Research Project 2694-4, Electric Power Research Institute 1987, no adequate or reliable methods for satisfactorily quantifying the effects of such facilities exists.

A hydroelectric generating area commonly consists of a dam and an associated reservoir wherein a large quantity of river water is stored temporarily. The retained water passes through hydroelectric generating turbines and the like in a manner known to those skilled in the art. When a dam or other hydroelectric facility is constructed in a stream or river for such purposes as development of power or storage of water for industrial, municipal or irrigation purposes, certain types of fish may be attracted to or transported with the flow of water from the reservoir through the turbines and other bypass routes. As these fish travel in and through the turbines, which rotate at high speeds, fish may suffer injury or be killed as they come into contact with rotating turbine blades or shear forces. Additionally, the fish may suffer injury or death as a result of the changes in water flow and pressure which occur during turbine passage.

Thus, although beneficial to man, some hydroelectric generation facilities have been implicated as being destructive to many types of fish. Overflow spillways may provide some method of escape from the foregoing, however, when there is a water shortage for hydroelectric or irrigation purposes, the spillways may only be opened infrequently, if at all. Moreover, some spillway configurations may be detrimental to a fish population where, for example, the fish are swept downwardly at a precipitous angle and dashed at high velocity against a concrete apron or into an extremely turbulent pool.

In the past there have been attempts to form fish passage structures for diverting fish both upstream and downstream, as well as to form conduits bypassing hydroelectric dams or the like for the intended purpose of attempting to protect fish from passing through hydroelectric turbines and the like. Attempts to save fish have also included the netting and catching of fish for transport downstream by way of tank trucks, barges or the like thereby averting passage through the dam. These and other methods for the diversion of downstream migrating fish are described in Koch, U.S. Pat. No. 4,437,431; Matthews, Park, Achord and Ruele, *Static Seawater Challenge Test To Measure Relative Stress Levels in Spring Chinook Salmon Smelts*, Trans. of Am. Fisheries Society, 115:236-244 (1986) and Matthews et al., *Improved Bypass And Collection System For Protection Of Juvenile Salmon And Steelhead Trout At Lower Granite Dam*, U.S. National Marine Fisheries Service, Marine Fisheries Review 39(2):10-14. The attempts made at saving fish described above have serious drawbacks, not the least of which is the significant cost of such measures. A fish way or other diversion device is costly to install. Additionally, where attempts have been made to divert fish via a downstream passage structure, large amounts of water, otherwise useful for hydroelectric generation are normally lost. Thus, the efficiency of the use of the water and of the facility is greatly reduced.

In light of the potential environmental impact which a hydroelectric site may have both upon migrating and resident fish populations and in light of the significant costs often associated with remedying such an impact, Federal and State regulatory and environmental authorities often require a developer or owner of a site to plan and conduct studies detailing the environmental effect which the hydroelectric site has on fish passing through the site. The primary object of these studies is often to measure the environmental impact of the facility by calculating the injury and mortality rate for resident and migrating fish passing through the facility. Federal and State environmental authorities often condition operating and renewal licenses for such facilities on the results of such studies and may deny an operating license to facilities which inflict an unacceptable level of harm on migrating and resident fish populations. Additionally, where the environmental impact has been determined to be high, a regulatory authority may require a developer or owner to implement one or more expensive remedial measures including the construction of fish ways or other diversions, as a precondition to the issuance of an operating permit or license. Such remedial construction measures can exceed tens of millions of dollars in cost.

Given the high cost of remedial measures and the fact that an operating license or permit may be denied if a particular facility has been determined to cause excessive harm to a certain fish population, the accuracy of the study evaluating the effect of the facility on populations which pass through it is of crucial importance. If, based upon such a study, a developer or owner can report that only a small percentage of fish are affected by passage through the facility, costly remedial measures may be avoided. Before such a report will be accepted by the appropriate governmental regulatory authority, however, the owner or developer may often need to explain the details of how the study was performed and to substantiate its accuracy.

Heretofore, in order to collect the mortality data needed for operating licenses or permits several techniques have been employed. These include tracking radio tagged fish past a hydroelectric facility as well as mass marking techniques. In mass marking (stains, fin clips, coded tags) large numbers of fish are introduced upstream of a facility and a portion of these are recaptured after their passage through the facility, usually in some type of nets or screening device. Methods for attaching identification or radio tags to fish are disclosed in U.S. Pat. No. 3,820,545 to Jefferts; U.S. Pat. No. 3,369,525 to Dbrotnic, et al.; U.S. Pat. No. 4,790,090 to Sharber; U.S. Pat. No. 4,646,455 to Gardner; and U.S. Pat. No. 3,313,301 to Jeffers et al.

Monitoring fish passage and associated mortality via radio telemetry normally requires that a miniature radio transmitter be fixed in a suitable waterproof enclosure. That transmitter is then either inserted into the fish's stomach, surgically implanted, or externally attached to the fish. The tagged fish are then introduced upstream prior to the hydroelectric facility. Radio receivers are then used to track the fish after passage through the turbines. The status of each fish is determined by monitoring its movements. A steady signal would indicate that the test specimen is stationary and is therefore presumed dead. This presumption introduces uncertainty into the study, as some stationary fish may be healthy, but simply inactive. In addition, in order to determine if there are any delayed effects due to turbine passage, tracking will have to transpire over a number of days, normally a 72-hour period. Additional uncertainty is also introduced, as there are instances when a test specimen is preyed upon during the tracking period.

One such method for telemetrically monitoring migration has been described in Knight, Marancik and Layzer, *Monitoring Movements of Juvenile Anadromous Fish by Radio Telemetry*, Prog. Fish Cult 39(3):148-150. The method disclosed by this reference suffers from a number of significant problems. First, the tagged fish are often difficult to locate quickly after passing through the turbines especially if they move into deep pools, as the strength of the signal will attenuate as the depth of the transmitter within the water increases. As a result, a third to a half of the tagged fish may go undetected. Of course, for each fish that goes undetected the uncertainty and margin for error introduced into the results of the study increases. In addition, it bears noting that the cost of each transmitter tag is substantial and typically few of these tags are ever recovered. Also, because of the inherent unreliability and unpredictability of this method, several seasons may be needed to complete a study. Finally, because of the man-power requirements of locating and tracking dispersed fish and because of the often protracted time period needed to determine delayed effects of turbine passage, the costs of conducting such studies are often substantial.

A number of modifications have been made to this known method, in an attempt to increase the percentage of fish recovered. While these modifications have to some extent increased the percentage of fish recovered, the modifications themselves have introduced additional uncertainty into the study with the result that the overall accuracy of the study has not been significantly enhanced. For example, in one such modification, nets are introduced in the tailwaters to collect the fish. Netting permits the recovery of a percentage of the test specimens but often the capture technique itself introduces additional uncertainty into the study. According to this method nets are deployed at the turbine port outlets or downstream a short distance so as to trap and recover the fish quickly after their turbine passage and before they may disperse. These nets themselves are expensive to construct and install and often require on-going maintenance and repair. More importantly, however, the fish are often injured as a result of the netting and when the fish are recovered it is often impossible to determine whether the injury resulted from the turbine passage or from the netting. As a result, those using this method typically assume that all fish recovered in a deceased state lacking visible damage were killed by the net and not by some other cause. This assumption ignores the possibility of suffocation, shock and other mortalities which do not manifest themselves visibly and externally, but which may occur as the fish passes through the turbine, thereby drawing into question the results of the study. Although water filled boxes with diminished water currents ("live cars") attached to the end of a collecting net have lessened the magnitude of injury associated with the capture net in some instances, these devices add to the cost in that they require considerable maintenance as well as a large sampling of fish. Additionally, high flow conditions and large debris loads in the water often make these live cars ineffective or inoperable.

Another modification which has been attempted is the attachment of buoyant floats, fishing floats, or the like to the fish prior to their introduction upstream. These floats tend to float and may bring the fish to the surface after their turbine passage thereby simplifying their recovery. However, the problem presented by this method is that there is no way to control the buoyancy of these floats. The float may inhibit or otherwise interfere with the natural movement of the fish as it approaches and passes through the turbine. Often, the fish surface before or during their turbine passage and may come into contact with stationary or moving parts of the turbine facility thereby causing severe, if not fatal injury to the fish. Since after recovery it is difficult to determine whether the injury resulted from factors associated with the float or from the turbine, the accuracy of this method is at best doubtful. Additionally, because of drag forces the float can be readily torn from the fish during passage.

Finally, it has been known to conduct fish migration studies wherein fish have been placed in sealed plastic bags containing water and some chemicals capable of producing a gas. The bagged fish are then introduced upstream of the dam as the chemicals in the bag react to form a gas. After passage through the turbines the formed gas forces the bags to the surface facilitating their recovery. This method has numerous drawbacks. By putting the fish in a sealed bag during the test fish may be deprived of oxygen thereby increasing the mortality rate. Furthermore, the movement of the fish within the bag may be difficult to control. Since this movement may increase the rate of any chemical/gas-producing reaction within the bag, it may cause inflation to incur prior to entry into the turbines. Finally, the bags themselves seriously impair the natural movement of the fish and its ability to propel itself within the water. To the extent this natural movement is altered by the surrounding bag, the accuracy and reliability of the study is drawn into question.

Of the known prior art methods discussed above, all have limitations which have been heretofore unsuccessfully addressed. Known methods have proved to be unreliable, inaccurate, expensive, and time-consuming.

SUMMARY OF THE INVENTION

The present invention provides a method and apparatus for monitoring the migration of a macroorganism, preferably a fish, with a selectively activated floatation device attached securely but temporarily to the fish. The floatation device improves visual monitoring and retrieval of the fish after turbine passage by facilitating their location quickly, prior to dispersal. In an alternate embodiment, the floatation device is used in combination with radio transmitter tags thereby decreasing the time needed to search for the floatation device and attached fish. This alternate method is particularly appropriate in large tailwater areas where swift currents can rapidly disperse test specimens throughout a large area within minutes.

Other advantages of the method and apparatus disclosed herein include the rapid recovery of a high percentage of tagged fish, thereby increasing the accuracy and reliability of the data obtained and decreasing the time and costs required as compared with known methods. The present invention also provides for the determination of delayed effects of station passage by providing for the retention of the recovered test specimens in a holding facility for the desired time period. The confounding effects of an identifying mark or tag attached to or incorporated into a test specimen during the assessment period are minimized because the floatation devices and attachment apparatus are removed as soon as a test specimen is recovered, usually, within minutes after introduction.

DETAILED DESCRIPTION OF THE INVENTION

Figure 1:
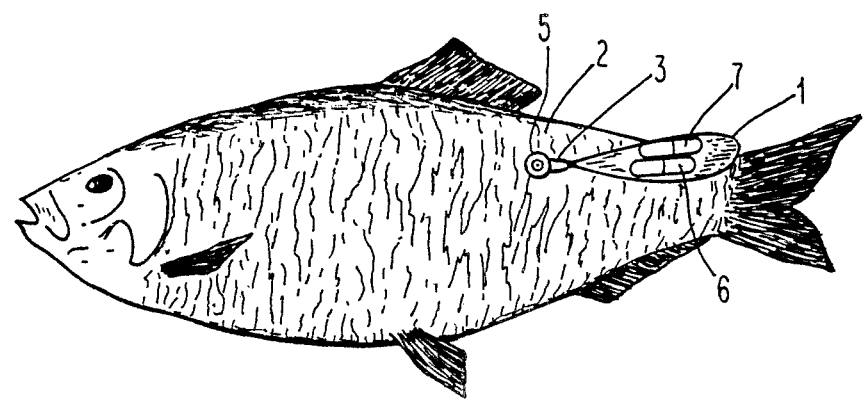
FIG. 1 is a side view of a fish having an inactivated floatation device attached thereto.

Referring to FIG. 1, there is shown an inactivated floatation device 1 fastened to fish 2 by means of a tether 3. Preferably, tether 3 is formed of a nylon monofilament, typically fishing line or suture material. Tether 3 is attached to a pin 4 which is inserted through the flesh of fish 2 preferably below the posterior edge of the dorsal fin. In the preferred embodiment, the insertion of pin 4 is accomplished by means of a piercing gun or surgical needle, although the tether 3 may also be attached to fish 2 by other methods such as glue or staples.

Tether 3 can be secured to either pin 4 or to securing grommet 5. At the opposite end of tether 3 there is secured the floatation device. Within the floatation device are disposed capsules 6 and 7 containing reactants capable of forming or liberating a gas when mixed. Capsules 6 and 7 are preferably formed of a water soluble protein of high average molecular weight derived from collagen, typically gelatin. Other non-proteinaceous materials, such as cellulosic materials, capable of being formed into capsules or which are slowly water soluble may also be employed.

Figure 2:
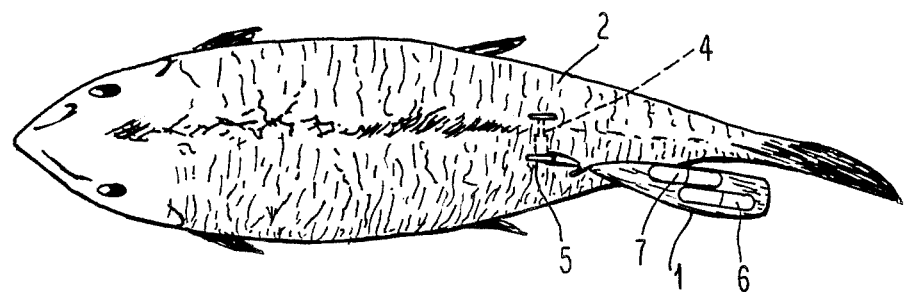
FIG. 2 is a top view of the fish shown in FIG. 1.

The key component of the instant invention is the floatation device which is selectively activated and which is temporarily but securely attached to the fish before it is placed into the water. As shown by FIGS. 1 and 2, in the unexpanded, uninflated state, the floatation device generally trails behind the fish to which it is attached by virtue of the forward movement of the fish. The size of the inactivated floatation device is also preferably much smaller than the fish to which it is attached. Thus, the floatation device does not obstruct or otherwise impede normal piscean activity. Best results will be obtained if the floatation device is sized to the swimming strength of the test specimen.

As shown by FIGS. 1 and 2, the floatation device in the inactivated state comprises a generally flat, inflatable, selectively sealable enclosure such as a balloon or condom. It may even be the finger portion of a latex glove which has been cut to form the sealable enclosure. In the preferred embodiment, two gelatin capsules containing chemical compounds capable of liberating or otherwise forming a gas are employed. It can be seen, however, that in certain instances at least one of the chemical compounds may be placed directly in the enclosure in the form of a liquid solution. In these instances, two capsules will not be required as the reacting components will nevertheless be present.

In the preferred embodiment, there is placed in one capsule an aqueous slurry of a carbonated salt and in another capsule a weak organic acid. Over time, the aqueous slurry of the carbonated salt and the organic acid solution each dissolve the capsule's walls allowing the aqueous solutions to admix, react and form the gaseous matter. When the present invention is employed to determine the injury or survival rates of fish passing through a hydroelectric turbine facility, it is desirable that the time for the reaction to take place be at least as great as the time it takes for the tagged fish to be introduced above and exit below the dam.

In alternate embodiments (not shown), capsules 6 or 7 are made of frangible or breakable material. In these embodiments, the capsule or capsules are broken or crushed so as to release their contents and the reactants are mixed directly. In these embodiments as well, it is desirable that the time for the reaction to take place is at least as great as the time it takes for the tagged fish to be introduced above and exit below the dam.

Figure 3:
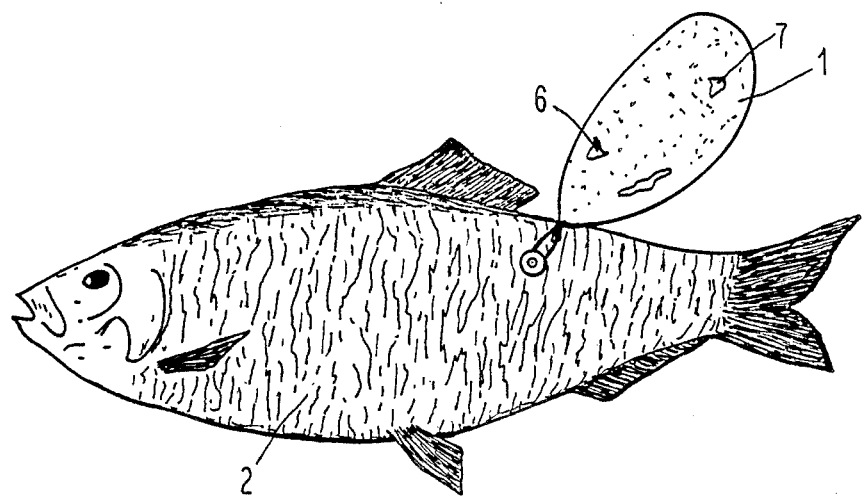
FIG. 3 is a side view of a fish having an activated floatation device attached thereto.

Referring now to FIG. 3, floatation device 1 attached to fish 2 is shown in its activated, inflated state. Within the activated floatation device there are shown the remains of partially dissolved capsules 6 and 7. As may be seen, for certain applications, it may be desirable to increase or decrease the rate with which the floatation device activates. Activation of the floatation device will depend on the rate at which the capsule's walls dissolve or are broken which will in turn dictate the rate at which the gas is formed. The rate at which the walls dissolve can be controlled by a number of factors. These factors include the material from which the capsules are fabricated, the thickness of the capsule walls, the amount of water present in both the aqueous slurry or in the aqueous acid solution, the type of acid used and its ability to dissolve capsule materials, as well as any combination of the above.

Preferably, the aqueous slurry is a saturated solution of sodium bicarbonate and the dilute organic acid is a greater than 90% solution of acetic acid, which when mixed, react to form gaseous carbon dioxide. The formation of carbon dioxide gas within the uninflated, sealed enclosure, causes the enclosure to expand and inflate. The inflation of the enclosure within the water causes the enclosure with the fish attached thereto to gently rise to the surface of the water providing both a convenient visual key to fish location and simultaneously facilitating fish retrieval. Furthermore, because the fish remains at all times surrounded by and beneath the surface of the water, trauma to the fish in this method is minimized and greatly improved over other known methods.

Other chemical reactants which are capable of reacting to liberate or otherwise form a gas capable of causing the sealed enclosure to become buoyant, such as hydrogen sulfide gas, cyanide gas, ammonia, chlorine, bromine, hydrogen, oxygen or nitrogen may also be employed in the apparatus of the instant invention.

Figure 4:
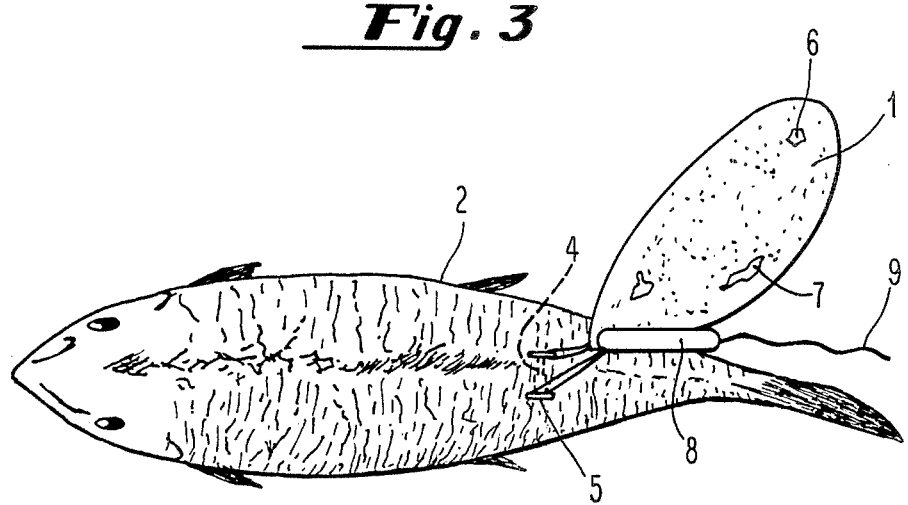
FIG. 4 is an alternate embodiment showing a top view of a fish having an activated floatation device and a radio transmitter tag attached thereto.

As shown in FIG. 4, the instant invention may also be used in combination with a radio transmitter tag 8 having whip antenna 9 attached thereto. Other appropriate antennae, as for example a tuned loop antenna, (not shown) may also be used. Radio transmitter tag 8 may be attachably secured by a tether 3 to either end of Pin 4 or directly to grommet 5. Floatation device 2 may also be secured to Pin 4 or grommet 5 in the same manner. In addition to the visual key and the facilitation of retrieval which is provided by the inflated floatation device as it floats at the surface of the water, the instant invention when used in combination with known radiotelemetry devices such as micro radio transmitters and the like normally decreases the time required to locate and recover a tagged fish. Known radiotelemetry fish tag devices typically transmit steady or pulsed radio signals which when used in combination with a related receiver tuned to the proper frequency allow means for the following or tracking of the tagged fish. Typically, such devices are inserted esophageally into the stomach of the fish, surgically implanted in the body cavity, or they are attached by anchor tags through the skin of the fish. Also typically, the radio tagged fish may move into deep pools, thus rendering the transmitted signal either difficult to receive or erratic in its transmission. The instant invention however, because it places the tagged fish at or near the surface of the water, allows transmission of the radio signal unimpeded by the presence of the greater depth of water, thus facilitating radio tracking of the tagged fish.

Figure 5:
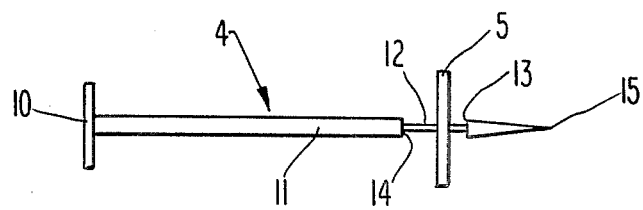
FIG. 5 is a side view of the securing pin used in the instant invention.

In FIG. 5 there is shown a side view of securing pin 4 of the present invention. At one end of securing pin 4 there is positioned head 10. At the opposite end there is point 15. As shown in the drawing, body 11 is generally cylindrical and separates head 10 from point 15. Positioned between body 11 and point 15 is notch 12. Notch 12 is formed from body 11, and is preferably thinner in diameter than body 11. Notch 12 includes a forward ridge 13 and a rearward ridge 14 which define notch 12. When in use, grommet 5 (shown in partial cut away view) is positioned between ridge 13 and 14, thereby providing a means for attaching grommet 5 to the securing pin more securely. Preferably, grommet 5 is formed of a disc of resilient plastic or silicone material which allows securable insertion and ready removal from pin 4.

The present invention may be embodied in other specific forms without departing from the spirit or essential attributes of the invention. Accordingly, reference should be made to the appended claims, rather than to the foregoing specification, as indicating the scope of the invention.

What is claimed is:

1. A method for monitoring the movement of a macroorganism within an aquatic environment comprising the following steps:
    (A) attaching an inactivated floatation device to said macroorganism;
    (B) introducing said macroorganism into said aquatic environment with said floatation device in an inactivated state; and
    (C) monitoring said macroorganism within said aquatic environment after said floatation device has been activated.

2. The method of claim 1 further comprising the step of forming said floatation device.

3. The method of claim 2 wherein the step of forming said floatation device comprises the step of disposing first and second reactants within said floatation device, wherein said first and second reactants are capable of reacting to form or liberate a gas.

4. The method of claim 3 wherein said floatation device is expandable.

5. The method of claim 4 wherein said floatation device is a balloon.

6. The method of claim 3 wherein said first reactant is further disposed within a dissolvable enclosure.

7. The method of claim 6 wherein said dissolvable enclosure is formed from a water soluble material.

8. The method of claim 6 wherein said dissolvable enclosure is a gelatin capsule.

9. The method of claim 3 wherein said first reactant is a chemical selected from the group consisting of sodium carbonate, sodium bicarbonate, potassium carbonate, magnesium carbonate, calcium carbonate.

10. The method of claim 9 wherein said second reactant is a chemical selected from the group consisting of acetic acid, hydrochloric acid, sulfuric acid, nitric acid.

11. The method of claim 1 wherein step (A) further comprises attaching a radio transmitter tag to said macroorganism.

12. The method of claim 1 wherein step (A) further comprises inserting a radio transmitter tag into the body of said macroorganism.

13. The method of claim 11 or claim 12 wherein said monitoring step includes receiving a signal transmitted by said radio transmitter tag.

14. The method of claim 1 wherein said introducing step occurs upstream of a hydroelectric facility.

15. The method of claim 1 wherein said monitoring step occurs downstream of a hydroelectric facility.

16. The method of claim 1 wherein said macroorganism is a fish.

17. A method for evaluating the mortality rate of a macroorganism population in an aquatic environment comprising the steps of:
    (A) capturing at least one test macroorganism;
    (B) attaching an inactivated floatation device to said at least one test macroorganism;
    (C) introducing said at least one test macroorganism into said aquatic environment with said floatation device in an inactivated state;
    (D) locating said at least one test macroorganism within said aquatic environment after said floatation device has been activated;
    (E) retrieving said located at least one test macroorganism from said aquatic environment.

18. The method of claim 17 further comprising the step (F) of placing said retrieved at least one test macroorganism into an observation tank.

19. An apparatus for monitoring the migration of a fish comprising a selectively activated floatation device secured to said fish, said floatation device being formed from a sealable enclosure and having first and second reactants disposed within said enclosure, wherein said first and second reactants are capable of reacting to form or liberate a gas.

20. The apparatus of claim 19 wherein said floatation device enclosure is expandable.

21. The apparatus of claim 19 wherein said floatation device enclosure is formed from a balloon.

22. The apparatus of claim 19 wherein said first reactant is further disposed within a dissolvable enclosure.

23. The apparatus of claim 22 wherein said dissolvable enclosure is formed from a water soluble material.

24. The apparatus of claim 22 wherein said dissolvable enclosure is a gelatin capsule.

25. The apparatus of claim 19 wherein said first reactant is a chemical selected from the group consisting of sodium carbonate, sodium bicarbonate, potassium carbonate, magnesium carbonate, calcium carbonate.

26. The apparatus of claim 25 wherein said second reactant is a chemical selected from the group consisting of acetic acid, hydrochloric acid, sulfuric acid, nitric acid.

27. The apparatus of claim 19 further comprising a radio transmitter tag, said transmitter tag being securely attached to said fish.

28. The apparatus of claim 19 further comprising a radio transmitter tag, said transmitter tag having been inserted into the body of said fish.

* * * * *